No. 725,530. PATENTED APR. 14, 1903.
C. G. WINN.
CHEESE CUTTER.
APPLICATION FILED NOV. 1, 1902.
NO MODEL. 4 SHEETS—SHEET 1.
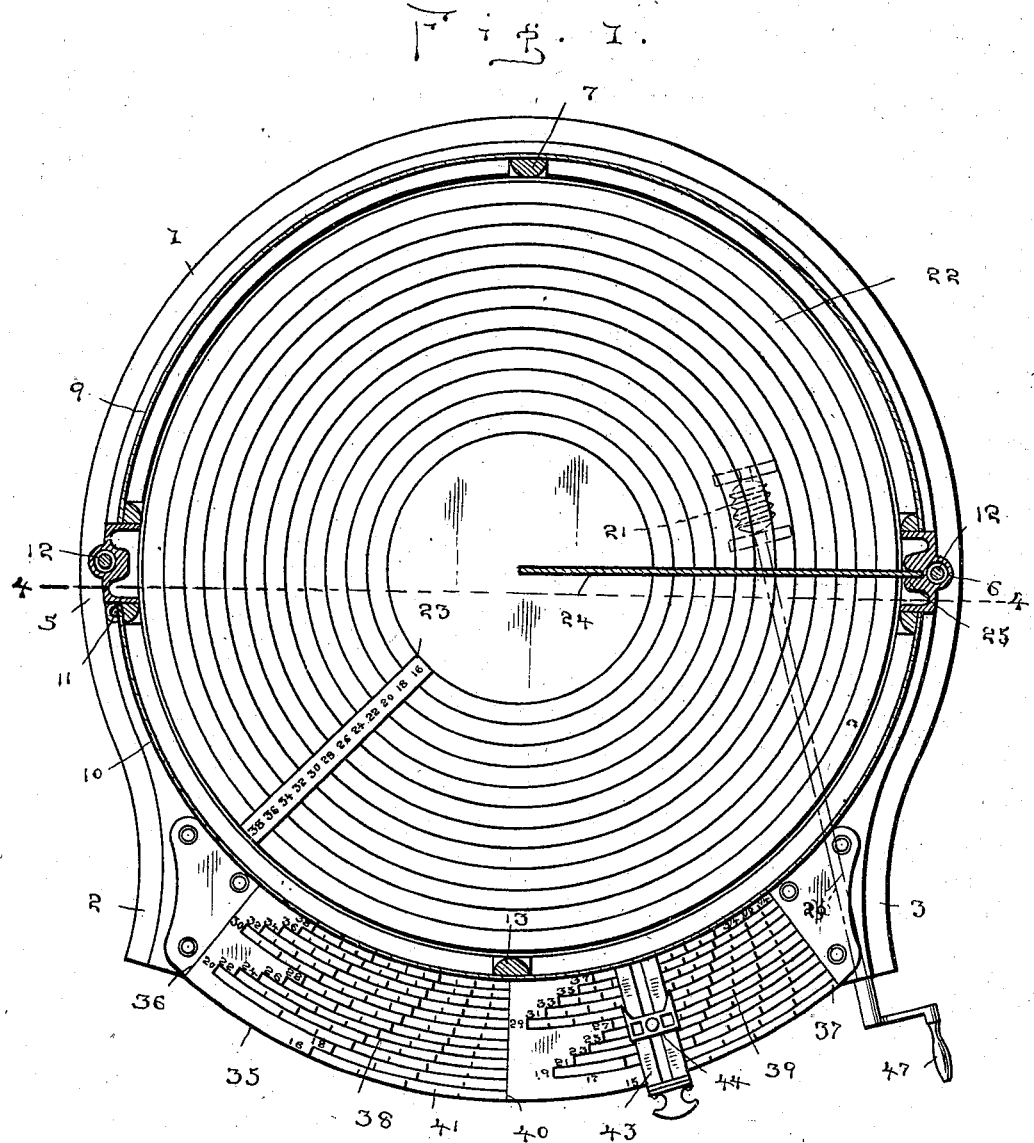

No. 725,530. PATENTED APR. 14, 1903.
C. G. WINN.
CHEESE CUTTER.
APPLICATION FILED NOV. 1, 1902.
NO MODEL. 4 SHEETS—SHEET 2.
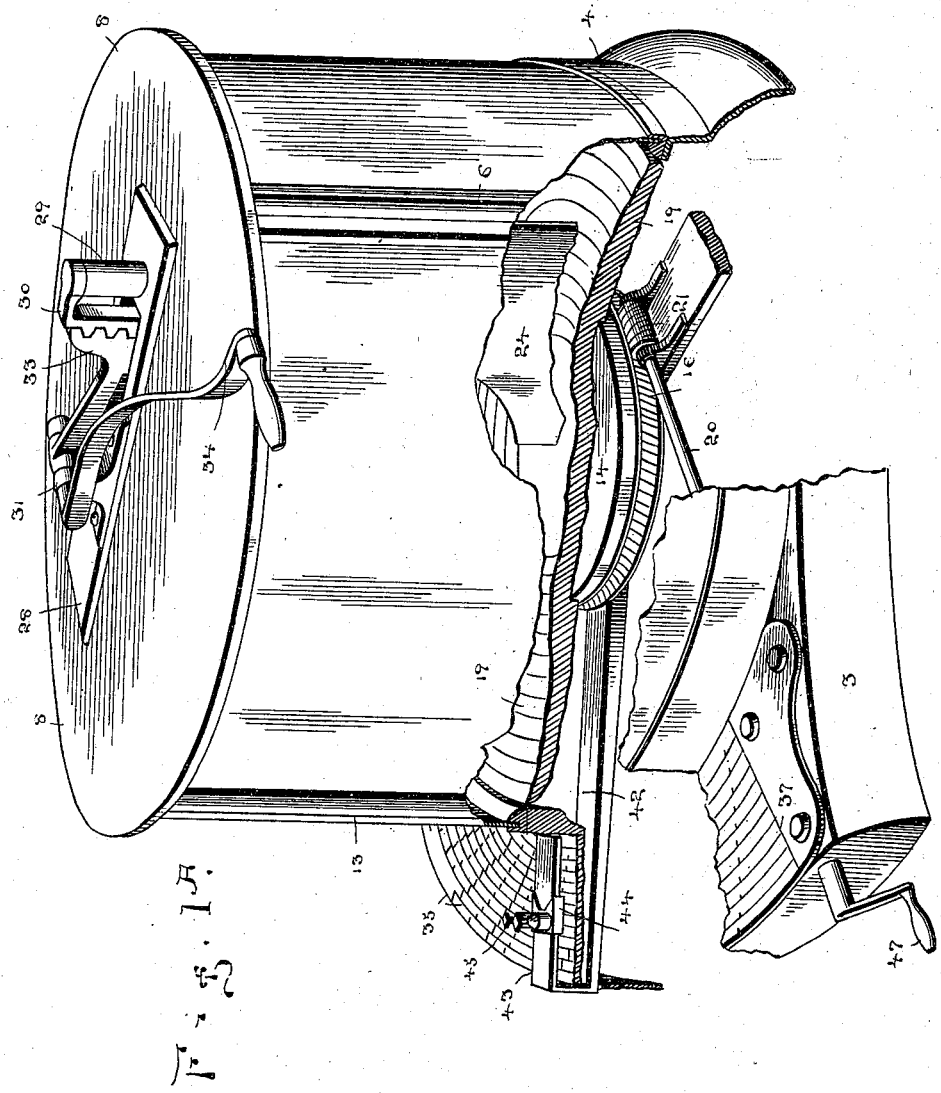
Charles G. Winn, Inventor
Witnesses
By Victor J. Evans.
Attorney

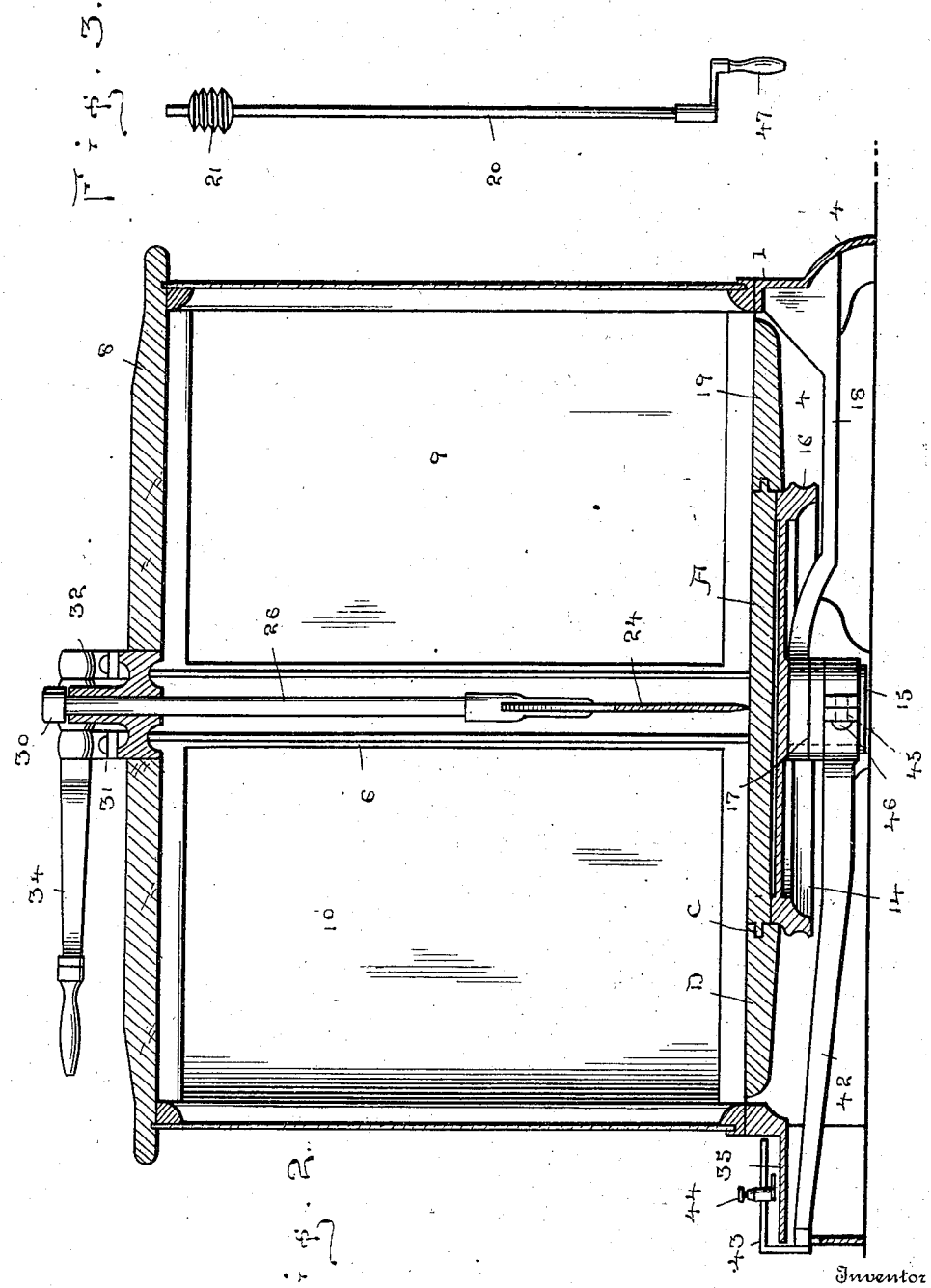

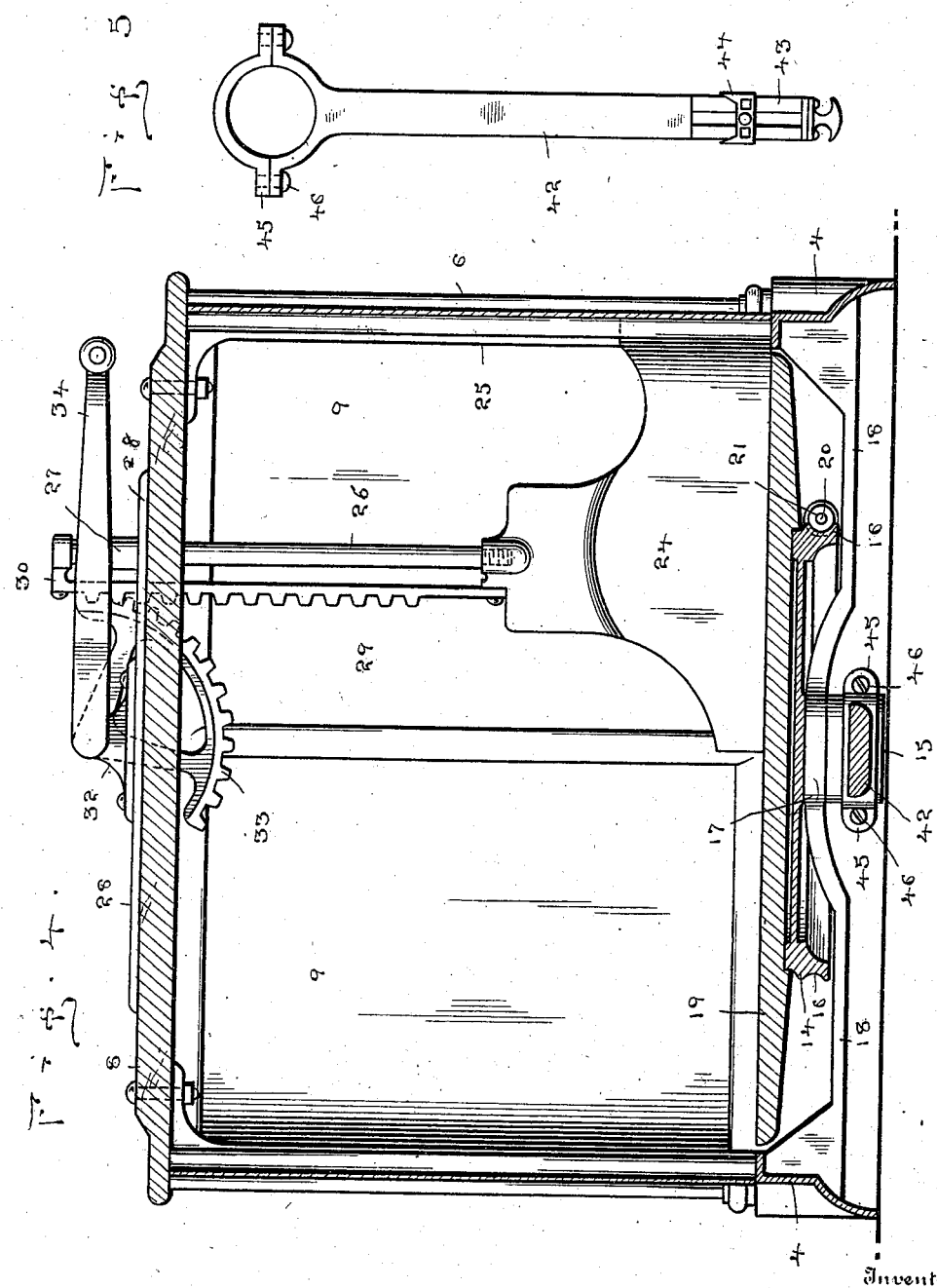

UNITED STATES PATENT OFFICE.

CHARLES G. WINN, OF SHREVEPORT, LOUISIANA.

CHEESE-CUTTER.

SPECIFICATION forming part of Letters Patent No. 725,530, dated April 14, 1903.

Application filed November 1, 1902. Serial No. 129,750. (No model.)

*To all whom it may concern:*

Be it known that I, CHARLES G. WINN, a citizen of the United States, residing at Shreveport, in the parish of Caddo and State of Louisiana, have invented new and useful Improvements in Cheese-Cutters, of which the following is a specification.

My invention has relation to improvements in cheese boxes or receptacles and cheese-cutters; and the object is to provide a device of the class or kind mentioned wherein a cheese may be revolubly placed, and with the receptacle is associated a cutting mechanism whereby a certain and determined quantity of the cheese may be cut off for delivery to the customer.

The invention consists in the novel construction of parts and their combination and aggroupment in operative assemblage, as will be hereinafter fully specified, and the novelty thereof particularly pointed out and distinctly claimed.

I have fully and clearly illustrated my improved device in the accompanying drawings, forming a part of this specification, and wherein—

Figure 1ª is a perspective view of the complete apparatus, certain parts at the base being broken away to clearly show the rotating mechanism and also showing the lever for actuating the knife. Fig. 1 is a horizontal section through the receptacle or casing, showing the revoluble floor in plan view, the weight-graduated plate, the graduating-arm, and the radial scale to indicate the position of the cheese as placed in the receptacle. Fig. 2 is a vertical section taken on the line 2 2 of Fig. 1. Fig. 3 is a detail view of the actuating-rod with worm for rotating the floor on which the cheese is placed. Fig. 4 is a vertical section, taken on the line 4 4 of Fig. 1, showing the means for actuating the knife. Fig. 5 is a detail view of the graduating-arm and the graduator-slide.

In the drawings similar reference notations appearing in the several illustrations designate the same parts.

The receptacle which incloses the cheese comprises a suitable circular base-frame 1, provided with suitable projecting plates 2 3 at the front portion to receive and support the graduated weight-plate, as hereinafter stated. The ring or frame constituting the base-support is provided with legs 4, on which it and the other elements of the receptacle are supported. From the base 1 rise diametrically-posited standards 5 6 and a rear supporting-standard 7, and on the top of these standards is arranged and suitably secured the cover 8. The rear semicircular wall 9 is made, preferably, of glass or other suitable transparent substance. The front of the receptacle is inclosed by a glass door 10, semicircular in cross-section, and at one side is hinged to the standard 5, as indicated at 11 in Fig. 1 of the drawings, and lodges with its other vertical edge against the edge of the standard 6. Binding-rods 12 secure the top and base firmly in relative position. It will be perceived that the door 10 swings open to the extent to admit a cheese as large as the capacity of the receptacle will admit and that when the door is closed the cheese is completely enveloped by the receptacle.

14 designates a wheel arranged centrally in the lower end of the receptacle and having a comparatively large hub 15, extending downward the desired distance. The wheel 14 is provided on its periphery with worm-gear teeth 16, as indicated in the drawings. The wheel 14 is maintained in position by having its hub passed through a ring 17, supported by radial arms 18, having their outer ends integral with or rigidly secured to the inner face of the legs or frame of the base, as seen in Figs. 2 and 4 of the drawings.

On the upper face of the wheel 14 is arranged a turn-table 19, constituting the floor of the receptacle. This floor may be a solid disk approximately fitting the receptacle, as shown in Fig. 4, or it may be made up of a central circular disk mounted concentrically on the wheel 14 and a broad circular table-flange suitably secured to the central disk, substantially as shown in Fig. 2 of the drawings. The floor is revolved by means of a shaft 20, suitably located and journaled in the base of the device, whereon is mounted a worm 21, which engages with the teeth on the rim of the wheel 14. It will now be perceived that when the shaft 20 is rotated the floor or table will, through the connection therewith, be also rotated.

On the table are designated concentric circles 22, graduated from the innermost circle to the outermost to indicate the different dimensions and weight of the stock and utilized in centering the cheese upon the table. For visual inspection and direction a radially-arranged plate 23 is placed on the face of the table, or radial lines parallel with each other may be traced on the table and the indications placed between them on the spaces between the circles, as seen in Fig. 1 of the drawings.

24 designates the cutter or knife, consisting of a thin steel blade high enough to serve the purpose and disposed radially, with its inner end at the axial point of the revoluble table and its outer end slidingly placed in a vertical groove or channel 25 in the inner face of the standard 6, being thereby guided and braced in its work. Approximately central to the back of the knife is secured a vertical rod 26, which is slidably projected through a vertical sleeve 27, rising from a bracket-plate 28, secured to the top of the cover of the receptacle. A rack-bar 29 has its lower end fixed to the back of the knife and is carried up parallel with the rod 26 and extended slidably through the plate 28, and also has fixed to its upper end a plate or arm 30, the other end of which is fixed to the upper end of the rod 26, and thus holds the ends of the rack and rod firmly in alinement with each other, as shown in the drawings.

On the plate 28 are formed alining bearing-standards 31 32, wherein are mounted the trunnions of a sector-gear 33, which meshes with the vertical rack 29 and operates to raise and lower the knife. To operate the sector-gear, a lever 34 is secured to the extended end of one of the trunnions.

On the extensions 2 3 of the base are secured the ends of a curved plate 35, posited concentric to the axis of the revoluble table and of course concentric to the respective circular weight-lines indicated on the table and having end lines 36 37 arranged radially to the axis of the revoluble floor or table and divided into two segments 38 39 by a central radial line 40, drawn radially to the axis of the table. The end line 39 and the central line 40 constitute base-lines by which the weight-registering arm is set in relative position to the fixed line of the cutter to indicate the weight of the piece of the stock to be cut off and delivered to the customer. On the segments 38 39 are indicated in serial concentric relation a plurality of weight-spaces 41, numbered in weight values in increasing arithmetical progression from the outermost weight-space, the common difference being two. On the segment 38 the first term is named as 16, and the series ends with 38 on the innermost line, and on the segment 39 the first term is 15 and the last 37. Each weight-space of the respective series is divided into sections or blocks indicating quarters, halves, three-quarters, and pounds and may run from one pound to the desired limit of the usual sales, according to the capacity of the receptacle.

To indicate and predetermine the size and weight of the piece of the stock to be cut off, an arm 42 is clamped to the hub 15 of the wheel 14 and extends radially therefrom and at its outer end is carried vertically and then turned over and inward, as at 43, overhanging the segmental plate 35, as shown, and on the overhanging plate is slidably mounted a slide 44, which can be moved to any point to register the weight on any line of the weight-scale required. The ring which connects the arm 42 to the hub of the turn-table is made in two parts and is detachably secured thereto by means of ears 45, through which clamping screws or bolts 46 are passed.

To utilize my invention, the following steps may be adopted: The cutter, it will be perceived, stands on a fixed radial line emanating at the axial center of the turn-table and reaching to the perimeter thereof. The cheese is placed on the turn-table and adjusted to agree with the circle thereon agreeing with its circumferential line. The crank 47 is then turned to rotate the shaft 20 and the turn-table until the arm 42 registers with the proper setting-line—say line 37 of segment 39, which carries the odd-numbered weight designations. The gage-slide 44 is then moved to the line on the segment indicating the weight of the cheese within the receptacle, and the machine is then ready for the cutting operation. Now suppose it is desired to cut one pound of cheese. The knife is brought down and forced through the cheese, making the preliminary cut, and is then drawn up free from the cheese. The turn-table is then rotated until the arm 42 registers with the pound-line, and then the knife is again brought down, and the piece cut will weigh one pound. If the weight-line is exhausted by successive cuts, the arm 42 may be swung back to the setting-line and the operation repeated.

The apparatus not only cuts determined quantities with reasonable accuracy, but it saves much waste.

Having thus fully described the invention, what is claimed as new is—

1. A cheese-cutter, comprising a suitable circular casing, a supporting-base therefor, radially-extending supporting-arms having a central ring at their inner ends, a wheel formed with a depending hub journaled in said ring and having annular gear-teeth on its perimeter, an arm extending radially from the hub of the wheel and formed with a turned-over indicating-piece, a graduated weight-plate over which the indicator moves, a turn-table carried by the worm-wheel to rotate therewith, means to rotate the worm-wheel, and a vertically-reciprocable knife to cut the cheese.

2. A cheese-cutter comprising a suitable circular casing, a supporting-base therefor, radially-extending supporting-arms having a central ring at their inner ends, a rotatable worm-wheel formed with a depending hub journaled in said central ring, an arm detachably and adjustably secured to the hub and extending radially therefrom and formed at its outer end with an inwardly-directed overhanging indicating-arm, an indicating weight-plate over which the indicating-arm is movable, a turn-table mounted on the worm-wheel and revoluble therewith, a rotary worm in engagement with the worm-wheel, a radially-disposed knife in the casing, a vertical rod having its lower end secured to the knife, and its upper end extending through the top of the casing, a vertical rack-bar parallel with the vertical rod and having its lower end secured to the knife and its upper end to the top of the rod, a sector-gear mounted on the casing in engagement with the rack-bar, and a lever to operate the sector-gear.

In testimony whereof I affix my signature in presence of two witnesses.

CHARLES G. WINN.

Witnesses:
T. A. SMITH,
M. P. NEILSON.